US012634087B2

(12) United States Patent
Fouad et al.

(10) Patent No.: US 12,634,087 B2
(45) Date of Patent: May 19, 2026

(54) ENCODING ENHANCE FEEDBACK THROUGH COMBINATIONS OF PSFCH RESOURCES

(71) Applicant: Samsung Electronics Co., Ltd., Suwon-si (KR)

(72) Inventors: Yaser Mohamed Mostafa Kamal Fouad, San Diego, CA (US); Philippe Jean Marc Michel Sartori, Naperville, IL (US); Jung Hyun Bae, San Diego, CA (US); Mohammed Karmoose, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 17/992,673

(22) Filed: Nov. 22, 2022

(65) Prior Publication Data

US 2023/0188296 A1      Jun. 15, 2023

Related U.S. Application Data

(60) Provisional application No. 63/305,371, filed on Feb. 1, 2022, provisional application No. 63/289,391, filed on Dec. 14, 2021.

(51) Int. Cl.
*H04L 5/00* (2006.01)
*H04W 72/20* (2023.01)
(52) U.S. Cl.
CPC .......... *H04L 5/0053* (2013.01); *H04W 72/20* (2023.01)
(58) Field of Classification Search
None
See application file for complete search history.

(56) References Cited

U.S. PATENT DOCUMENTS

| | | | |
|---|---|---|---|
| 11,057,870 B2 | 7/2021 | Huang et al. | |
| 2020/0374978 A1* | 11/2020 | Panteleev | H04W 72/0446 |
| 2021/0028910 A1 | 1/2021 | Cheng et al. | |
| 2021/0075552 A1 | 3/2021 | Huang et al. | |
| 2021/0099269 A1 | 4/2021 | Wu et al. | |
| 2021/0105728 A1 | 4/2021 | Nguyen et al. | |

(Continued)

FOREIGN PATENT DOCUMENTS

| | | |
|---|---|---|
| CN | 111867099 A | 10/2020 |
| EP | 3895354 | 10/2021 |

(Continued)

OTHER PUBLICATIONS

Taiwanese Office Action and Search Report corresponding to TW Application No. 111147802, dated Feb. 11, 2026 (7 pages).

*Primary Examiner* — Jenkey Van
(74) *Attorney, Agent, or Firm* — Womble Bond Dickinson (US) LLP

(57) ABSTRACT

A system and a method are disclosed for sending enhanced feedback through PSFCH resources. In an embodiment, a receiving user equipment (Rx UE) determines that enhanced feedback is to be sent to a transmitting user equipment (Tx UE), such as based on resource pool configuration, a request from the Tx UE for enhanced feedback, or detection of a triggering event. The Rx UE encodes the enhanced feedback into a combination of a plurality of PSFCH resources based on an encoding scheme. The Rx UE then transmits the encoded feedback information in the plurality of PSFCH resources.

19 Claims, 6 Drawing Sheets

(56)     References Cited

U.S. PATENT DOCUMENTS

| | | | |
|---|---|---|---|
| 2021/0105768 A1 | 4/2021 | Nguyen et al. | |
| 2021/0144750 A1 | 5/2021 | Cao et al. | |
| 2021/0391951 A1 | 12/2021 | Lee et al. | |
| 2022/0070847 A1 | 3/2022 | Yoshioka et al. | |
| 2022/0085921 A1 | 3/2022 | Zhang et al. | |
| 2022/0150027 A1* | 5/2022 | Sun | H04L 1/1861 |
| 2022/0201654 A1* | 6/2022 | Lee | H04W 72/20 |
| 2023/0062805 A1* | 3/2023 | Baek | H04L 5/0091 |
| 2023/0069882 A1* | 3/2023 | Zhao | H04L 5/0094 |
| 2023/0247590 A1* | 8/2023 | Wu | H04W 74/0825 |
| | | | 370/329 |
| 2024/0073867 A1* | 2/2024 | Zhao | H04W 72/40 |
| 2024/0073930 A1* | 2/2024 | Khoryaev | H04W 72/20 |

FOREIGN PATENT DOCUMENTS

| | | | |
|---|---|---|---|
| TW | 202102032 A | 1/2021 | |
| WO | WO 2020/125990 A1 | 6/2020 | |
| WO | WO 2021/032018 A1 | 2/2021 | |
| WO | WO 2021/147864 A1 | 7/2021 | |

* cited by examiner

FIG. 1

202 Identify feedback information to send to a UE

204 Encode feedback information into data to be transmitted in a plurality of PSFCH sequences according to an encoding schem 206 Transmit encoded feedback information in the plurality of PSFCH sequences to the UE

ENCODING ENHANCE FEEDBACK THROUGH COMBINATIONS OF PSFCH RESOURCES

CROSS-REFERENCE TO RELATED APPLICATION

This application claims the priority benefit under 35 U.S.C. § 119(e) of U.S. Provisional Application No. 63/289, 391, filed on Dec. 14, 2021, and U.S. Provisional Application No. 63/305,371, filed on Feb. 1, 2022, the disclosures of both of which are incorporated by reference in their entirety as if fully set forth herein.

TECHNICAL FIELD

The disclosure generally relates to new radio (NR) sidelink communications. More particularly, the subject matter disclosed herein relates to improvements to usage of PSFCH resources to provide enhanced feedback.

SUMMARY

The following is a list of acronyms used in this disclosure and their respective definitions:

| Abbreviation | Definition |
|---|---|
| SL | Sidelink |
| NR | New Radio |
| CP | Cyclic Prefix |
| CS | Cyclic Shift |
| ACK/NACK | Acknowledgement/ Negative Acknowledgement |
| UE | User Equipment |
| TB | Transport Block |
| Tx UE | Transmitting User Equipment |
| Rx UE | Receiving User Equipment |
| gNB | Base Station (gNodeB) |
| SCI | Sidelink Control Information |
| PSCCH | Sidelink Shared Control Channel |
| PSSCH | Sidelink Shared Data Channel |
| HARQ | Hybrid automatic repeat request |
| MAC CE | Medium Access Control Control Element |
| CSI | Channel State Information |
| PSFCH | Sidelink Feedback Channel |
| PRB | Physical Resource Block |
| PHY ID | Physical Layer Identifier |
| V2X | Vehicle to Everything |

NR SL transmissions are becoming increasingly more common for applications that benefit from high throughput and reliability that is difficult to achieve using Long-Term Evolution (LTE) technology, such as advanced driving which utilizes wireless communications between different sensors of a vehicle or platooning of autonomous vehicles which utilizes wireless communications between the vehicles.

In NR SL, three types of PSFCH-based transmissions are considered based on the cast type as follows: Unicast transmission in which the Rx UE provides an ACK/NACK to the Tx UE upon request (i.e., when HARQ is enabled by the Tx UE in the corresponding sidelink control information (SCI); Groupcast transmission Option 2, in which each one of the intended receivers within the group provides an ACK/NACK to the Tx UE upon request (i.e., when HARQ is enabled by the Tx UE in the corresponding SCI); Groupcast Option 1, in which each one of the intended receivers within the group provides a NACK only when it fails to receive and when it falls within the covered area by the transmission as indicated by the SCI. Note that all UEs use the same PSFCH sequence to provide the NACK.

In particular, for each PSCCH/PSSCH transmission, a set of corresponding PSFCH resources are identified based on a mapping rule. This set contains multiple RBs and are in a specified time slot that corresponds to the PSCCH/PSSCH transmission. Now within each RB, there exists 12 subcarriers thus allowing a transmission of up to 12 orthogonal ZC sequences by configuration. Now, to provide the feedback, each UE uses two sequences (i.e., one for transmitting an ACK and another to transmit a NACK) based on the Tx UE Physical ID.

A UE can be indicated by an SCI format scheduling a PSSCH reception, in one or more sub-channels from a number of $$N_{subch}^{PSSCH}$$

sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled.

A UE expects that a slot $$t_k'^{SL}$$

$(0 \leq k \leq T'_{max})$ has a PSFCH transmission occasion resource if k mod $$N_{PSSCH}^{PSFCH} = 0,$$

where $$t_k'^{SL}$$

is defined in [6, TS 38.214], and $T'_{max}$ is a number of slots that belong to the resource pool within 10240 msec according to [6, TS 38.214], and $$N_{PSSCH}^{PSFCH}$$

is provided by sl-PSFCH-Period-r16.

A UE may be indicated by higher layers to not transmit a PSFCH in response to a PSSCH reception.

If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGa-pPSFCH-r16, of the resource pool after a last slot of the PSSCH reception.

A UE is provided by sl-PSFCH-RB-Set-r16 a set of $$M_{PRB,set}^{PSFCH}$$

PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $$N_{PSSCH}^{PSFCH}$$

the UE allocates the $$\left[\left(i + j \cdot N_{PSSCH}^{PSFCH}\right) \cdot M_{subch,slot}^{PSFCH}, \left(i + 1 + j \cdot N_{PSSCH}^{PSFCH}\right) \cdot M_{subch,slot}^{PSFCH} - 1\right]$$

PRBs from the $$M_{PRB,set}^{PSFCH}$$

PRBs to slot i among the PSSCH slots associated with the PSFCH slot and sub-channel j, where $$M_{subch,slot}^{PSFCH} = M_{PRB,set}^{PSFCH} / \left(N_{subch} \cdot N_{PSSCH}^{PSFCH}\right),$$

$0 \le i <$ $$N_{PSSCH}^{PSFCH},$$

$0 \le j < N_{subch}$, and the allocation starts in an ascending order of i and continues in an ascending order of j. The UE expects that $$M_{PRB,set}^{PSFCH}$$

is a multiple of $$N_{subch} \cdot N_{PSSCH}^{PSFCH}.$$

A UE determines a number of PSFCH resources available for multiplexing HARQ-ACK information in a PSFCH transmission as $$R_{PRB,CS}^{PSFCH} = N_{type}^{PSFCH} \cdot M_{subch,slot}^{PSFCH} \cdot N_{CS}^{PSFCH}$$

where $$N_{CS}^{PSFCH}$$

is a number of cyclic shift pairs for the resource pool and, based on an indication by higher layers, $$N_{type}^{PSFCH} = 1$$

=1 and the $$M_{subch,slot}^{PSFCH}$$

PRBs are associated with the starting sub-channel of the corresponding PSSCH, $$N_{type}^{PSFCH} = N_{subch}^{PSSCH}$$

and the $$N_{subch}^{PSSCH} \cdot M_{subch,slot}^{PSFCH}$$

PRBs are associated with one or more sub-channels from the $$N_{subch}^{PSSCH}$$

sub-channels of the corresponding PSSCH.

The PSFCH resources are first indexed according to an ascending order of the PRB index, from the $$N_{subch}^{PSSCH} \cdot M_{subch,slot}^{PSFCH}$$

PRBs, and then according to an ascending order of the cyclic shift pair index from the $$N_{CS}^{PSFCH}$$

cyclic shift pairs.

A UE determines an index of a PSFCH resource for a PSFCH transmission in response to a PSSCH reception as $$(P_{ID} + M_{ID}) \bmod R_{PRB,CS}^{PSFCH}$$

where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift $\alpha$, from a cyclic shift pair index corresponding to a PSFCH resource index and from $$N_{CS}^{PSFCH}$$

using Table 1.

cation range (even if they did not successfully decode the TB). Option 2 for groupcast supports the ACK/NACK feedback from all RX UEs: an RX UE sends ACK if it has successfully decoded the TB or it sends NACK if it has not decoded the TB, after decoding the 1st-stage SCI. For

TABLE 1

| | Set of cyclic shift pairs | | | | | |
|---|---|---|---|---|---|---|
| | $m_0$ | | | | | |
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α [4, TS 38.211], as in Table 2 if the UE detects a SCI format 2-A with Cast type indicator field value of "01" or "10", or as in Table 3 if the UE detects a SCI format 2-B or a SCI format 2-A with Cast type indicator field value of "11". The UE applies one cyclic shift from a cyclic shift pair to a sequence used for the PSFCH transmission.

TABLE 2

Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

TABLE 3

Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

NR V2X supports ACK/NACK feedback for the SL HARQ feedback in unicast: an RX UE sends ACK if it has successfully decoded the TB carried in a PSSCH or it sends NACK if it has not decoded the TB after decoding the 1st-stage SCI. For groupcast, two options (Option 1 and Option 2) are supported for the SL HARQ feedback in NR V2X. For Option 1, an RX UE transmits NACK if it has not successfully decoded the TB (after decoding the 1st-stage SCI) and if its relative distance to the TX UE (referred as Tx-Rx distance) is less than or equal to the required communication range (indicated in the 2nd-stage SCI). Otherwise, the RX UE does not transmit any HARQ feedback. As the HARQ feedback for this option would only consist of NACK, option 1 is referred to as NACK-only feedback.

Option 1 is where RX UEs do not transmit HARQ feedback because they have successfully decoded a TB or because they are outside the minimum required communiunicast or any of the groupcast options, an RX UE does not send a reply if the RX UE does not decode the 1st-stage SCI.

With option 1, the RX UEs of a transmission share a resource for sending their NACK-only feedback, while with option 2 each RX UE sends its ACK/NACK feedback on a separate resource. Thus, with option 1 a TX UE cannot identify which RX UEs sent NACK. If a TX UE receives at least one NACK with option 1, it is aware that at least one RX UE within the required communication range did not correctly decode the transmission. In addition, if a TX UE receives no reply with option 1, it cannot distinguish whether the RX UEs within the required communication range have successfully received the transmission or if some have not successfully decoded the corresponding 1st-stage SCI. On the other hand, a TX UE can distinguish the HARQ feedback of the RX UEs with Option 2. This enables the TX UE to perform a retransmission tailored to specific RX UE(s). With Option 2, if a TX UE receives no reply on the feedback resource corresponding to a given RX UE, it is aware that the RX UE has not successfully decoded the corresponding 1st-stage SCI. Consequently, Option 2 enables higher reliability for the transmissions.

The above advantages of Option 2 over Option 1, however, come at the expense of more resources required for the groupcast HARQ feedback. In NR V2X, the use of HARQ feedback and the choice whether to use Option 1 or Option 2 for groupcast HARQ feedback is up to UE implementation. For groupcast communications, the TX UE indicates in the 2nd-stage SCI whether NACK-only feedback (Option 1) or ACK/NACK feedback (Option 2) should be used. NACK-only feedback may be considered for groupcast services where the provided information may not be so relevant for RX UEs outside the communication range. For groupcast Option 1, the Tx-Rx distance is obtained at the RX UE based on the location of the TX UE. This location is indicated via the TX UE's zone ID carried in the 2nd-stage SCI. The Tx-Rx distance is derived at the RX UE based on its own location and the center of the nearest zone with the indicated zone ID. HARQ feedback for a TB sent on a PSSCH in a resource pool is carried on a PSFCH within the same resource pool. To disable the HARQ feedback for all SL transmissions in the resource pool, no resources for PSFCH are configured within the resource pool. Resources for PSFCH can be (pre-)configured periodically with a period of N=1, 2 or 4 slot(s), i.e., there is a PSCCH/PSSCH slot with a PSFCH symbol every N slots within the resource pool.

Even if resources for PSFCH are (pre-)configured, the 2nd-stage SCI indicates whether HARQ feedback is enabled or not for a TB sent in a given PSSCH. One physical resource block (PRB) is used for a PSFCH transmission. In one PRB, NR V2X supports code division multiplexing (CDM) between PSFCH transmissions of multiple RX UEs. With CDM, multiple transmissions share the same frequency resource simultaneously. To this aim, the transmissions should employ signals with low cross correlation (ideally orthogonal). This property allows a receiver to distinguish uncorrelated transmission signals that have been sent on the same time and frequency resources. Signals with low cross correlation can be generated from a periodic root or base sequence that has very good autocorrelation properties. A set of uncorrelated signals for CDM can be generated from cyclically shifted versions of the base sequence. The base sequence used for PSFCH is (pre-)configured per resource pool in NR V2X and it corresponds to a Zadoff-Chu sequence based on a format used for PUCCH in Rel. 15 NR Uu.

In a PRB used for PSFCH, the transmissions that can be multiplexed with CDM correspond to the HARQ feedback from several RX UEs. CDM is also used to distinguish the ACK or NACK feedback from an RX UE in the same PRB. To this aim, a pair of cyclic shifts (within a PRB) are used to distinguish the ACK or NACK from an RX UE. The cyclic shift corresponding to ACK is not defined in the case of NACK-only feedback for groupcast (Option 1). Thus, each PSFCH in NR V2X is mapped to a time resource (PSFCH symbol), a frequency resource (one PRB), and a code resource (one cyclic shift among a cyclic shift pair).

In some implementations, the PSFCH transmission occupies a single PRB with two of the ZC sequences being used for providing either ACK or NACK feedback. If the PSFCH transmission is occupying a single PRB, the transmission of the PSFCH may fail to meet Occupy Channel Bandwidth (OCB) requirements. In order to overcome OCB requirements, a UE may be configured to send the PSFCH in multiple resource blocks in the transmission. Additionally, UEs performing Listen Before Talk (LBT) sensing may end up repeating a transmission multiple times.

Given the repetitions in both the frequency and time domain, a single ACK/NACK may end up utilizing a large number of resources to send a small amount of information. Given the large number of resource blocks that are being utilized for PSFCH feedback, it would be beneficial if those resource blocks could be utilized to provide enhanced feedback.

To overcome these issues, systems and methods are described herein for encoding enhanced feedback in a combination of PSFCH resources. In embodiments, a receiving UE (Rx UE) determines that enhanced feedback should be provided, such as based on a request from a Tx UE, configuration for resource pool, or detection of a triggering event. The Rx UE identifies a plurality of resource blocks to include the enhanced feedback and encodes the enhanced feedback into a combination of cyclic shifts of the plurality of resource blocks. The Tx UE then decodes the enhanced feedback when the transmission block is received from the plurality of resource blocks.

By utilizing additional resource blocks in the PSFCH transmission for encoding enhanced feedback, extra information can be transmitted from the Rx UE to the Tx UE without increasing the number of transmissions sent. These resources can be sent simultaneously in different resource blocks of a single transmission block for latency reduction or across multiple slots to reduce power consumption.

Increasing the number of utilized resource blocks in a transmission increases the likelihood of collision with transmissions from other UEs. In order to decrease the likelihood of collisions, the transmission block may be divided into a plurality of subsets and the Rx UE may select one of the plurality of subsets for transmission of enhanced feedback, such as based on the Tx UE physical layer identifier (PHY ID). The subsets may be interlaced with each other to utilize frequency diversity gains and achieve higher reliability for PSFCH feedback.

In an embodiment, a method comprises encoding, at a receiving user equipment (Rx UE), feedback information into control information to be transmitted in a plurality of physical sidelink feedback channel (PSFCH) resources according to an encoding scheme, wherein the encoding scheme defines how to encode the feedback information into a combination of PSFCH resources; transmitting the encoded feedback information in the combination of the plurality of PSFCH resources from the Rx UE to a transmitting user equipment (Tx UE).

In some embodiments, the method further comprises detecting a request from the Tx UE to provide enhanced feedback; and performing the encoding and transmitting in response to detecting the request from the Tx UE to provide enhanced feedback. In an embodiment, detecting the request from the Tx UE to provide enhanced feedback comprises identifying a medium access control (MAC) control element in a transport block or a control signaling element in a first stage or second stage sidelink control information (SCI) provided by the Tx UE. In an embodiment, the request from the Tx UE to provide enhanced feedback specifies a type of feedback from a plurality of types of feedback that the Rx UE is configured to encode. In an embodiment the request from the Tx UE to provide enhanced feedback specifies a plurality of PSFCH resources and wherein the plurality of PSFCH resources in which the encoded feedback information is transmitted by the Rx UE is selected based on the request specifying the plurality of resources.

In some embodiments, the method further comprises selecting a strict subset of PSFCH resources in which to provide the encoded feedback information from a plurality of strict subsets of PSFCH resources configured for providing encoded feedback information. In an embodiment, selecting the strict subset of PSFCH resources is based on a physical layer identifier (PHY ID) of the Tx UE. In an embodiment, the strict subset of resource blocks comprises a plurality of non-consecutive resource blocks in a frequency domain.

In an embodiment, the plurality of PSFCH resources are selected from a strict subset of available PSFCH resources based on stored configuration information, wherein the stored configuration information identifies at least one PSFCH resource in the strict subset that is to be used by a plurality of UEs.

In an embodiment, the plurality of PSFCH resources that, in combination, encode the feedback information are transmitted in resources in multiple transmissions at different points in time.

In an embodiment, the method further comprises detecting a triggering event at the Rx UE; and, in response to detecting the triggering event, performing the encoding of the feedback information.

In an embodiment, a resource containing acknowledgement/negative acknowledgement (ACK/NACK) feedback is transmitted in a same transmission as the encoded feedback information and wherein the plurality of PSFCH resources are configured to exclude a resource reserved for the ACK/NACK feedback.

BRIEF DESCRIPTION OF THE DRAWING

In the following section, the aspects of the subject matter disclosed herein will be described with reference to exemplary embodiments illustrated in the figures, in which:

FIG. 1 is a diagram illustrating a communication system, according to an embodiment.

FIG. 7 is a block diagram of an electronic device in a network environment, according to an embodiment.

FIG. 8 shows a system including a UE and a gNB, in communication with each other.

DETAILED DESCRIPTION

Figure 1:
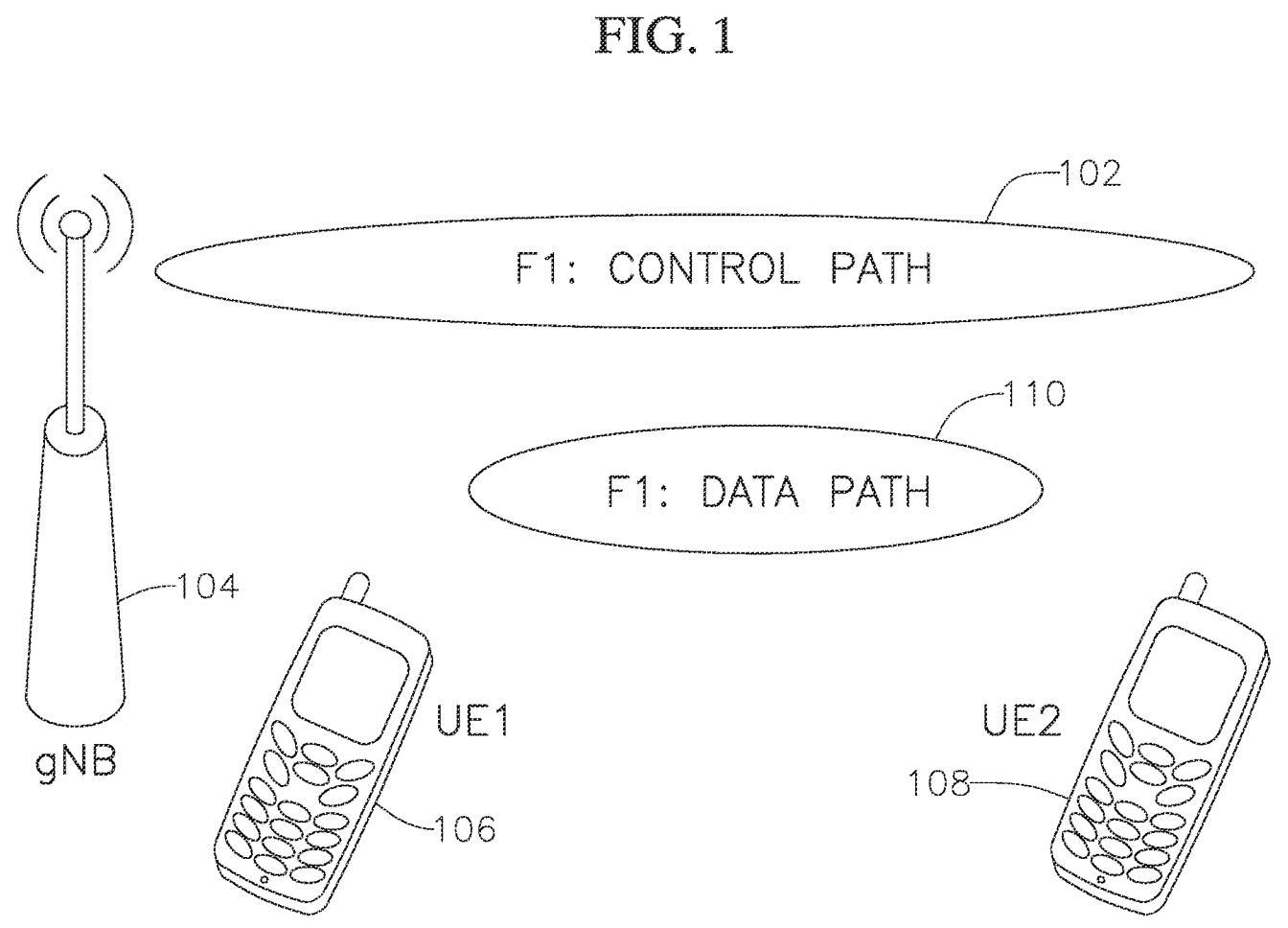

FIG. 1 is a diagram illustrating a communication system, according to an embodiment. In the architecture illustrated in FIG. 1, a control path 102 enables the transmission of control information through a network established between a gNB 104, a first UE 106, and a second UE 108. A data path 110 enables the transmission of data (and some control information) on an SL between the first UE 106 and the second UE 108. The control path 102 and the data path may be on the same frequency or may be on different frequencies.

Figure 2:
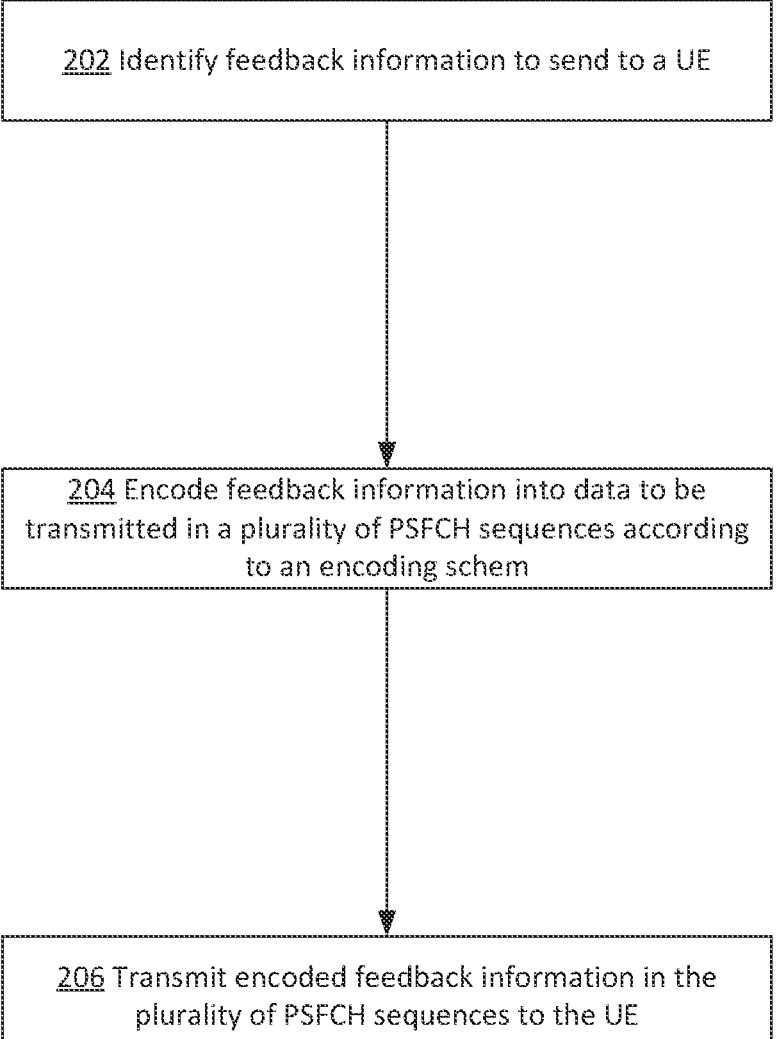
FIG. 2 depicts an example method of providing enhanced feedback through encoded PSFCH resources.

FIG. 2 depicts an example method of providing enhanced feedback through encoded PSFCH resources. At step 202, a first UE identifies feedback information to send to a second UE. For example, an Rx UE may identify feedback to send to a Tx UE in response to the Tx scheduling a PSSCH transmission. In some embodiments, the feedback is further identified based on a request from the Tx UE for enhanced feedback information using methods described herein. Enhanced feedback may include indication of a hidden node, half duplex, indication of a collision on a future reservation, beam index feedback for beam forming, identification of a set of suggested resources for a retransmission, and/or CSI, such as a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments. In some embodiments, the enhanced feedback is provided in addition to HARQ feedback.

At step 204, the first UE encodes the feedback information into data to be transmitted in a plurality of PSFCH resources according to an encoding scheme. The encoding scheme defines how to encode feedback information into a combination of PSFCH resources. For instance, an encoding scheme for a particular type of information may specify a plurality of resource blocks within a transport block which will be used to encode the feedback information and combinations of selected cyclic sequences within the resource blocks that correspond to different feedbacks in the feedback information. In some embodiments, multiple types of feedback may be provided through combinations of different sets of resource blocks. For example, a first type of feedback may be encoded in the first and third resource blocks while a second type of feedback is encoded in the second and fourth resource blocks.

At step 206, the first UE transmits the encoded feedback information in the plurality of PSFCH resources to a second UE, such as from an Rx UE to a Tx UE. In some embodiments, the plurality of PSFCH resources that encode the feedback information are transmitted simultaneously, such as in a single transport block. In some embodiments, the plurality of PSFCH resources that encode the feedback information are transmitted at different times, such as through transport blocks sent in different time slots. As an example, if a UE is configured to perform a blind retransmission before receiving an ACK/NACK, the PSFCH resources in both transmissions may be used to encode feedback information.

Figure 3:
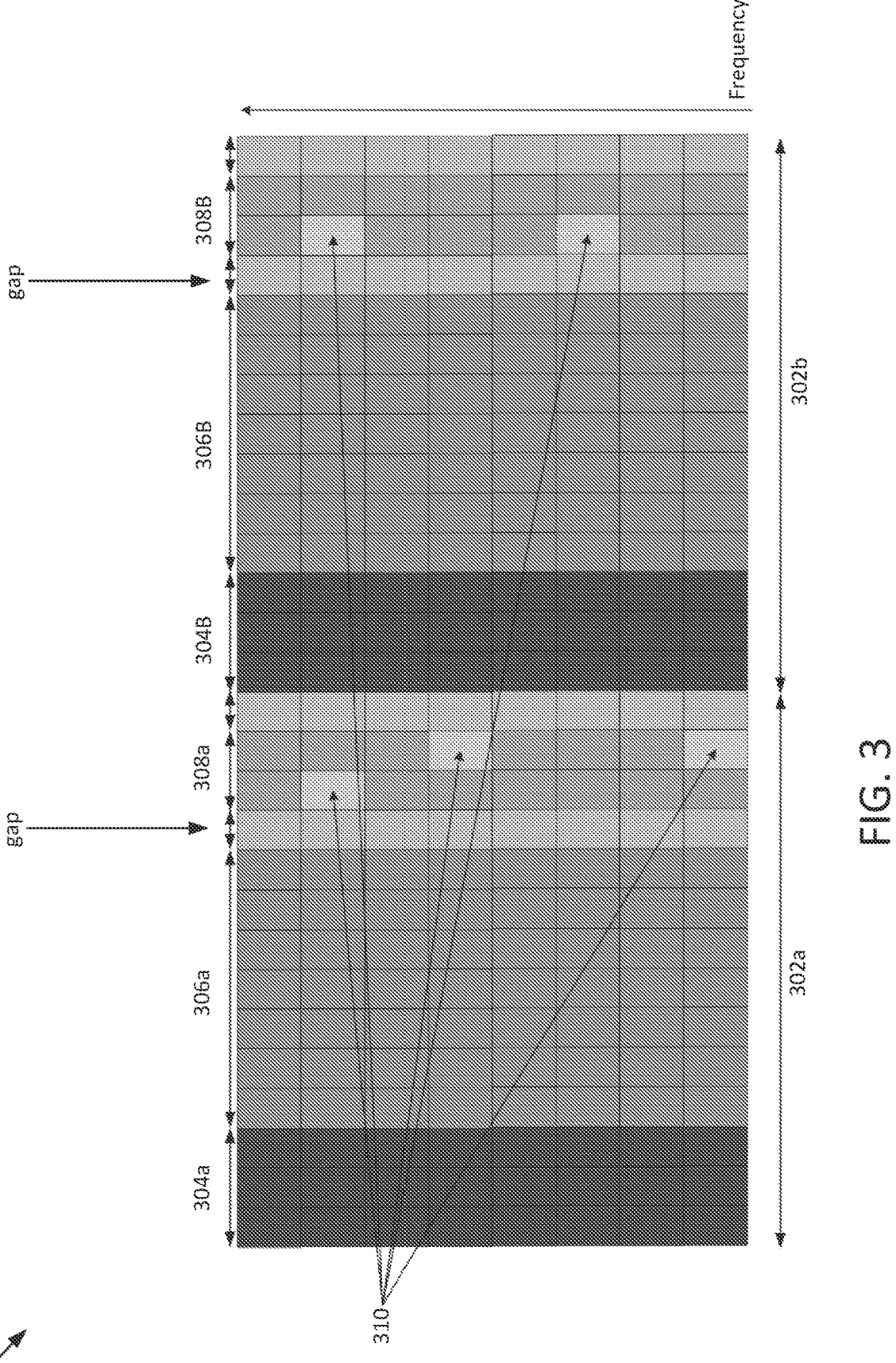
FIG. 3 depicts an example of encoding information through PSFCH resources in different time slots.

FIG. 3 depicts an example of encoding information through PSFCH resources in different time slots. Transmission 300 comprises two slots, slot 302a and slot 302b where slot 302b comprises a blind repetition of slot 302a. The transmission in slot 302a comprises PSCCH 304a, PSSCH 306a, and PSFCH 308a. The transmission in slot 302b comprises PSCCH 304b, PSSCH 306b, and PSFCH 308b. Resource blocks 310 are selected from both PSFCH 308a and PSFCH 308b to encode the enhanced feedback. Where resource blocks 310 comprise at least one different resource block from PSFCH 308a to PSFCH 308b, in other embodiments the same resource blocks may be selected in each time slot to encode the enhanced information. For example, if three resource blocks are used in each slot, then the UE can encode information using up to 6 different values.

In some embodiments, the second UE requests enhanced feedback from the first UE. For example, a MAC CE may be added by the second UE to the $1^{st}$ or $2^{nd}$ stage SCI of an initial transmission by the second UE which indicates a request for enhanced feedback. In some embodiments, the request may specify the resource blocks in which to encode the enhanced feedback. In other embodiments, the first UE may determine which resource blocks to use based on stored data identifying resource blocks for encoding enhanced feedback. In some embodiments the request for enhanced feedback specifies a type of enhanced feedback and/or an encoding scheme to use for providing the enhanced feedback. For example the second UE may request CSI from the first UE through a MAC CE added to the $1^{st}$ or $2^{nd}$ stage of the SCI. In some embodiments, the request includes additional information to help the receiving UE generate feedback information.

In some embodiments, the first UE determines to send enhanced feedback based on one or more triggering events. For example, the first UE may be configured to send additional information when the first UE has suffered a threshold number of consecutive failures, when the first UE detects a resource conflict, or when a beam signal strength falls below a pre-configured threshold. Additionally or alternatively, the first UE may determine to send enhanced feedback based on a configuration for the resource pool.

In some embodiments, the transmitting UE determines which resources to decode based on an expected encoding, such as an encoding expected to be provided due to a request or configurations of encoding schemes for the resource pool. In other embodiments, the transmitting UE blindly detects additional information in the received PSFCH, such as when the receiving UE determines to send additional information based on an event unknown to the transmitting UE, such as failures known to the receiving UE, conflicts known to the receiving UE, or other information used as a trigger by the receiving UE to transmit additional information. Depending on the resource blocks used for the additional information, the transmitting UE may determine a type of encoding which can be used to decode the value. For instance, if CSI information is held in resource blocks 1, 3, and 5, if the transmitting UE detects information in blocks 1, 3, and 5, the transmitting UE may determine that CSI information is being encoded.

In some embodiments, the size and/or type of enhanced feedback may depend on one or more triggering conditions. For example, the first UE may be configured to increase the number of resource blocks used to provide feedback if the first UE determines that more information needs to be sent, such as in response to detecting a hidden node.

In some embodiments, the first UE stores data identifying encoding scheme types, encoding values, resource blocks for encodings, and the encoding for the initial values. For example, the first UE may store data similar to the data stored in the below table:

TABLE 1

| EXAMPLE ENCODING SCHEME TABLE | | | |
|---|---|---|---|
| ENCODING SCHEME | VALUE | RESOURCE BLOCKS | ENCODING |
| CQI (Channel 5) | EXAMPLE 1 | 1, 3, 5 | 2, 5, 6 |
| CQI (Channel 5) | EXAMPLE 2 | 1, 3, 5 | 2, 5, 7 |
| . . . | . . . | . . . | . . . |
| SUGGESTED RESOURCES | 1, 4, 6, 9 | 2, 4, 6 | 3, 8, 3 |
| SUGGESTED RESOURCES | 1, 4, 7, 9 | 2, 4, 6 | 3, 8, 4 |
| . . . | . . . | . . . | . . . |

Table 1 is one depiction of an example of an encoding scheme and other embodiments may use other embodiments of encoding data across a plurality of resources. In Table 1, two encoding schemes are depicted, one for the CQI of channel 5 and one for suggested resources. Table 1 indicates, for each encoding scheme, the resource blocks in which data for the encoding scheme will be encoded. For instance, data for the CQI of channel 5 will be encoded in the combination of resource blocks 1, 3, and 5 whereas the data for suggested resources will be encoded in the combination of resource blocks 2, 4, and 6. For each value of an encoding scheme, Table 1 identifies an encoding for the value across the resource blocks. For example, to indicate suggested resources 1, 4, 6, and 9, the encoding comprises cyclic shifts of 3 for resource block 2, 8 for resource block 4, and 3 for resource block 6.

Figure 4:
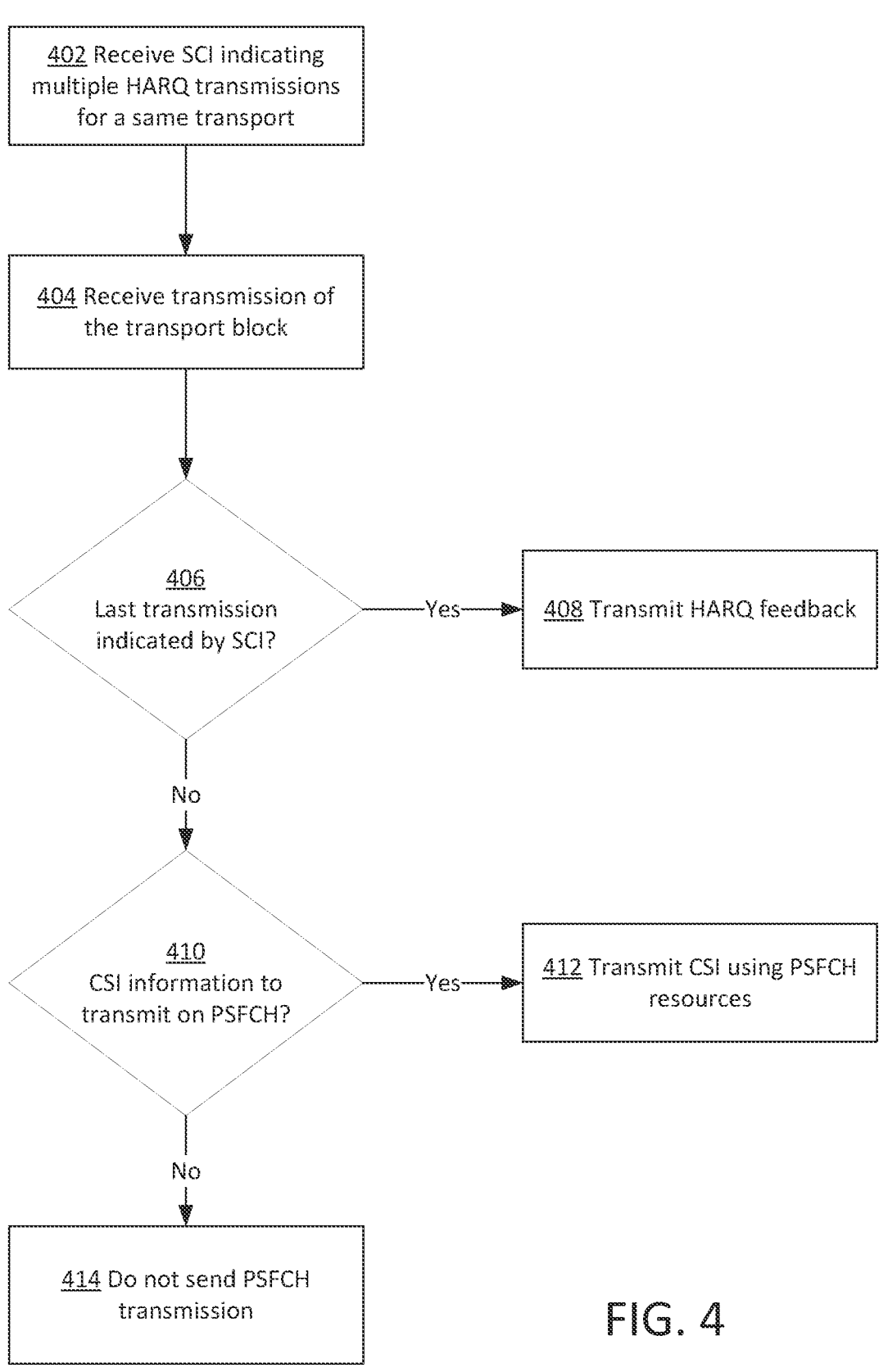
FIG. 4 depicts an example of a method performed by a UE configured to provide HARQ feedback and enhanced information.

In some embodiments, the method of FIG. 2 is used transmit additional information, such as CSI, along with HARQ feedback. The receiving UE may send the information and/or HARQ feedback using PSFCH parameters signaled by the transmitting UE in the SCI. FIG. 4 depicts an example of a method performed by a UE configured to provide HARQ feedback and enhanced information.

At step 402, the UE receives an SCI indicating multiple HARQ transmissions for a same transport block. At step 404, the UE receives the transmission of the transport block. At step 406, the UE determines whether the last transmission was indicated by the SCI. If the UE determines the last transmission was indicated by the SCI, at step 408 the UE transmits HARQ feedback. If the UE determines the last transmission was not indicated by the SCI, at step 410, the UE determines whether there is CSI information to transmit on the PSFCH. If the UE determines there is CSI information to transmit on the PSFCH, at step 412, the UE transmits CSI using the PSFCH resources according to the encoding methods described herein. If the UE determines there is no CSI information to transmit on the PSFCH, at step 414, the UE determines that a PSFCH transmission is not to be sent.

In some embodiments, the encoded feedback is sent from the first UE to the second UE along with unenhanced feedback. For example, ACK/NACK feedback may be provided in one or more resource blocks while the encoded feedback is provided in other resource blocks. The resource blocks with the unenhanced feedback may comprise legacy resource blocks, such as resource blocks specified in Rel-16 or Rel-17 as being reserved for providing ACK/NACK feedback. The receiving UE may be configured to send enhanced feedback only in resource blocks that are not reserved for other types of feedback. Additionally or alternatively, in embodiments where the transmitting UE specifies the resource blocks for enhanced feedback, the transmitting UE may be configured to avoid requesting resource blocks that are reserved for legacy feedback. In this manner, the receiving UE can provide expected feedback to UEs not configured to decode enhanced feedback while still providing the enhanced feedback for UEs that are configured to decode the enhanced feedback. In some embodiments, when sending a sequence of resource blocks, a first resource block of the sequence may be reserved for legacy information while at least two other resource blocks in the sequence are used to encode enhanced feedback.

In some embodiments, the first UE selects resources for providing enhanced feedback from a subset of available resource blocks. The first UE may select subsets of available resources for providing enhanced feedback based a PHY ID of the transmitting UE, a PHY ID of the receiving UE, or other information available to the first UE. As an example, the set of available resource blocks may be divided into disjoint subsets of four resource blocks each. The receiving UE may determine a disjoint subset as a mod (4) of the PHY ID of the transmitting UE. Thus, for a UE with a PHY ID 22, the selected subset would be 22 mod (4), which would be the second subset, whereas for a UE with a PHY ID of 15, the selected subset would be 15 mod (4) which would be the third subset. By dividing the set of resources into disjointed subsets, the likelihood of collisions is reduced. For instance, in the above example, only a quarter of the transmissions will include feedback sent on the same resource blocks. The number of resources in each subset and/or number of subsets may be configured for the resource pool.

In some embodiments, the subsets of resources are configured such that each subset includes a resource for providing unenhanced feedback. For example, if Rel-16 UEs are configured such that every fourth resource block is used to provide feedback, the Rel-18 UEs may be configured to provide enhanced feedback in subsets of four resource blocks, that way at least one of the resource blocks in the subset can be used for backwards compatible transmissions. The receiving UE may be configured to provide unenhanced feedback, such as ACK/NACK feedback on a first resource of the subset that is designated for feedback according to Rel-16 or Rel-17 configurations and enhanced feedback on two or more of the remaining resources of the subset using the methods described herein.

In some embodiments, a transmitting UE is configured to distinguish between resources sent from different UEs that are using the same resources to encode enhanced feedback. For example, two receiving UEs may determine a same subset of resources to use to encode enhanced feedback based on PHY IDs indicating a same set of resources, such as PHY IDs of 15 and 19 both indicating the third subset in the mod (4) example described above. In such an instance, a transmitting UE may determine the resources that include enhanced feedback for the transmitting UE based on power level of the resources, as resources coming from the same UE will share a same power level. For instance, the transmitting UE may discard resources that have a lower power level and decode the resources with the higher power level. As a practical example, the procedure for resource determine may be as follows:

A UE is provided by sl-PSFCH-RB-Set-r16 a set of $$M_{PRB,set}^{PSFCH}$$

PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $$N_{PSSCH}^{PSFCH},$$

the UE allocates the $$[(i+j\cdot N_{PSSCH}^{PSFCH})\cdot M_{subch,slot}^{PSFCH}, (i+1+j\cdot N_{PSSCH}^{PSFCH})\cdot M_{subch,slot}^{PSFCH} - 1]$$

PRBs from the $$M_{PRB,set}^{PSFCH}$$

PRBs to slot i among the PSSCH slots associated with the PSFCH slot and sub-channel j, where $$M_{subch,slot}^{PSFCH} = M_{PRB,set}^{PSFCH} / (N_{subch}\cdot N_{PSSCH}^{PSFCH}), 0 \le i < N_{PSSCH}^{PSFCH},$$

$0 \le j < N_{subch}$, and the allocation starts in an ascending order of i and continues in an ascending order of j. The UE expects that $$M_{PRB,set}^{PSFCH}$$

is a multiple of $N_{subch}$.

$$N_{PSSCH}^{PSFCH}.$$

A UE determines a number of PSFCH resources available for multiplexing HARQ-ACK information in a PSFCH transmission as $$R_{PRB,CS}^{PSFCH} = N_{type}^{PSFCH}\cdot M_{subch,slot}^{PSFCH}\cdot N_{CS}^{PSFCH} \text{ where } N_{CS}^{PSFCH}$$

is a number of cyclic shift pairs for the resource pool and, based on an indication by higher layers, $$N_{type}^{PSFCH} = 1$$

and the $$M_{subch,slot}^{PSFCH}$$

PRBs are associated with the starting sub-channel of the corresponding PSSCH $$N_{type}^{PSFCH} = N_{subch}^{PSSCH}$$

and the $$N_{subch}^{PSSCH}\cdot M_{subch,slot}^{PSFCH}$$

PRBs are associated with one or more sub-channels from the $$N_{subch}^{PSSCH}$$

sub-channels of the corresponding PSSCH

The PSFCH resources are first indexed according to an ascending order of the PRB index, from the $$N_{type}^{PSFCH}\cdot M_{subch,slot}^{PSFCH}$$

PRBs, and then according to an ascending order of the cyclic shift pair index from the $$N_{CS}^{PSFCH}$$

cyclic shift pairs.

After this process, a set S of resources can be used by the UE. The UE then determines which specific resource to use as follows:

A UE determines an index of a PSFCH resource for a PSFCH transmission in response to a PSSCH reception as $$(P_{ID} + M_{ID})\mathrm{mod}R_{PRB,CS}^{PSFCH}$$

where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01", otherwise, $M_{ID}$ is zero.

However, in the following case, the UE can know if the other PSFCH resources are used or not:

If the transmission is unicast, the Tx UE knows that all the resources of S should not be occupied by another UE.

There is no guarantee, however, because of the sensing procedure and mode-2 resource allocation If the transmission is groupcast, and if the Tx UE knows the number of Rx UEs in the group (e.g., groupcast option 2 wherein each UE is assigned a member ID by the higher layers), it can determine all the PSFCH resources that the UEs in the group will potentially use, thus, knows which PSFCH resources should be empty (pending interference, as explained above). Then, the UE can be allocated some of these unused resources:

Each Rx UE could be allocated additional MID values using, e.g., higher layer signaling. Following the Rel-16/17 procedure for multiple $M_{IDS}$, each Rx UE can then have multiple PSFCH resources A flag could be sent to one specific Rx UE (e.g., in the $1^{st}$ or $2^{nd}$ stage SCI or as a MAC CE). If the Rx UE receives this flag, it can then use all the non-allocated PSFCH resources for the group.

Figure 5:
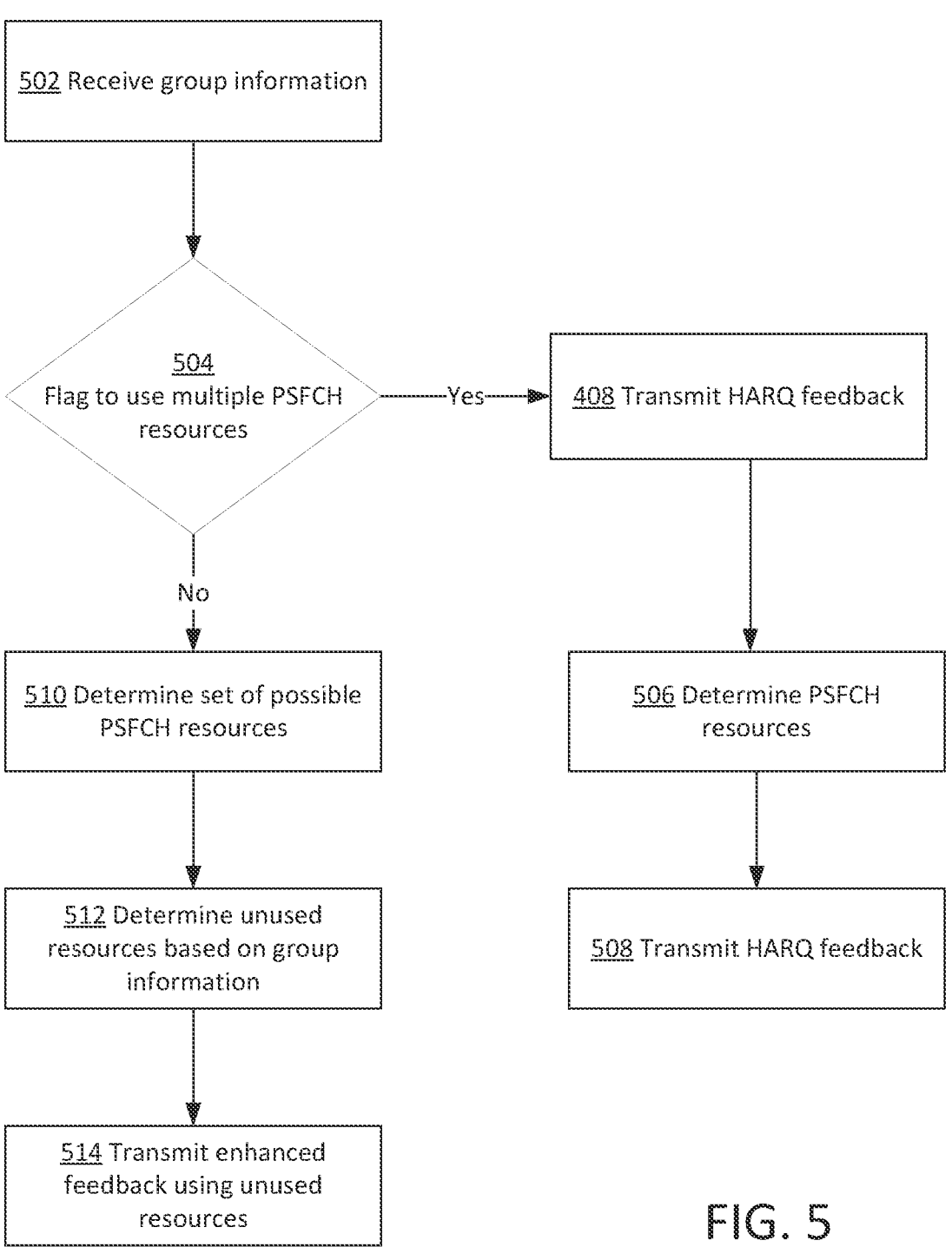
FIG. 5 depicts an example method for resource allocation in groupcast.

FIG. 5 depicts an example method for resource allocation in groupcast. At step 502, a receiving UE receives group information for a plurality of UEs. At step 504, the receiving UE determines if there is a flag indicating that the UE can use non-allocated PSFCH resources. For example, the receiving UE may identify the flag through data in the $1^{st}$ or $2^{nd}$ stage SCI or as a MAC CE. If the receiving UE does not identify the flag, at step 506, the receiving UE determines PSFCH resources for an individual transmitting UE and at step 508 transmits HARQ feedback using Rel-16/17 procedures. If the receiving UE identifies the flag, at step 510, the receiving UE determines a set of all possible PSFCH resources for transmission. At step 512, the receiving UE determines unused resources based on group information. At step 514, the receiving UE transmits enhanced feedback using a plurality of PSFCH resources of the unused resources.

The configuration of resources for providing feedback may include resources from the PSFCH channel, resources dedicated for scheme 2 feedback, or a combination of the two. In some embodiments, the configuration of resources include non-consecutive resource blocks.

The enhanced encoding mechanisms described herein may be used in unicast transmissions, groupcast Option 1 transmissions, and/or groupcast Option 2 transmission. In some embodiments, in the case of groupcast Option 2, the number of available resources within the subset used for feedback may be further divided among the UEs based on member IDs, thereby limiting the number of bits used for feedback.

In some embodiments, the subsets of resources used for encoding enhanced feedback comprise nonconsecutive resource blocks. For instance, subsets may be interlaced with each other such that a first resource block of a first subset is separated from a second resource block of the first subset by one or more resource blocks of different subsets. This allows a receiving UE to exploit frequency diversity when selecting PSFCH resources for providing enhanced feedback, as the resource blocks of the subset are separated enough to provide higher differences in frequency between resource blocks.

Figure 6:
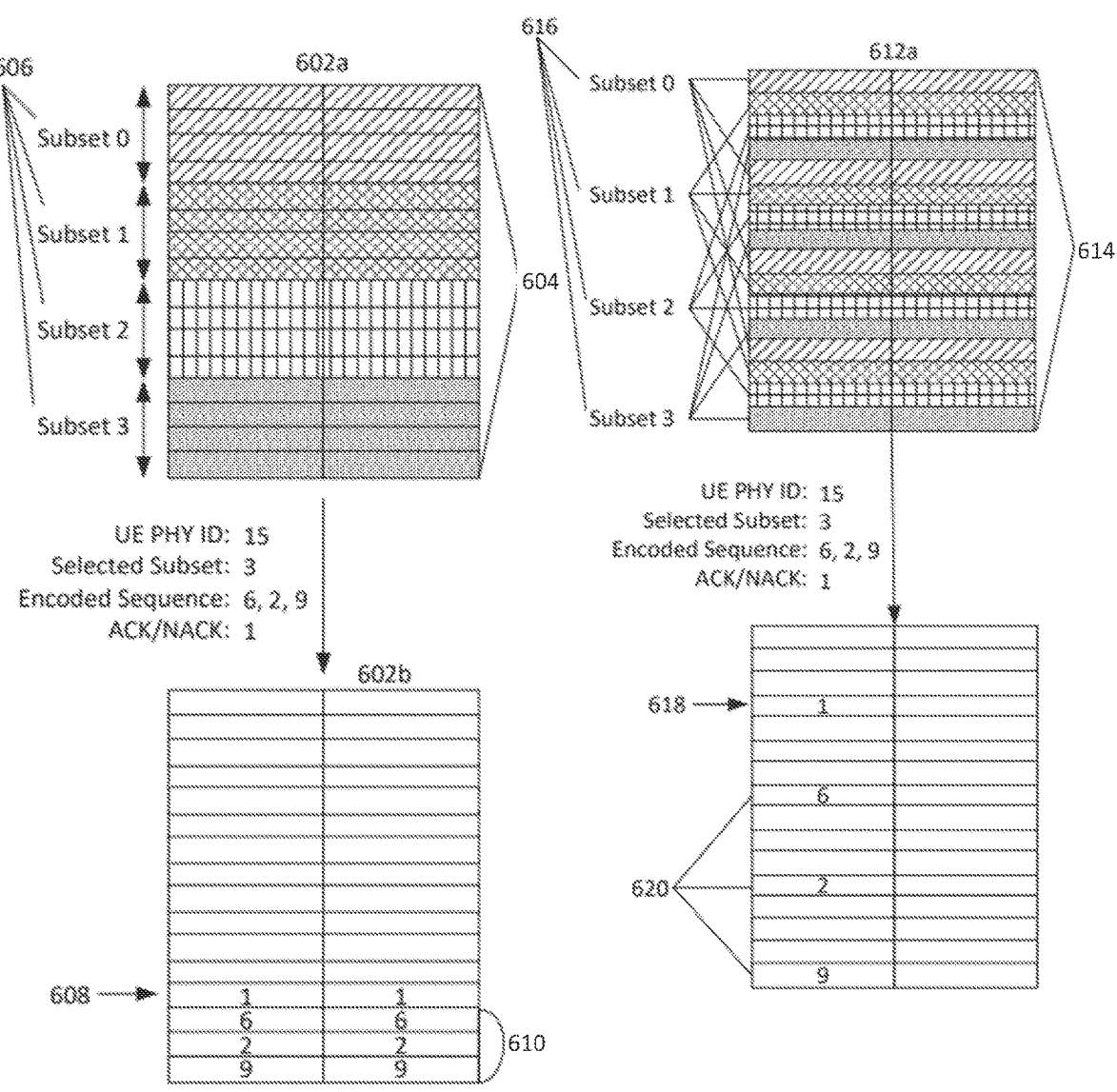
FIG. 6 depicts examples of PSFCH resources divided into subsets for enhanced encoding.

FIG. 6 depicts examples of PSFCH resources divided into subsets for enhanced encoding. Resource set 602a comprises a plurality of resource blocks 604 ordered by frequency. Subsets 606 comprise groupings of consecutive resource blocks used for enhanced feedback. In the example of FIG. 6, ACK/NACK information is sent in the first resource block of the subset and encoded feedback is sent in the remaining resource blocks of the subset. Thus, resource set 602b includes the ACK/NACK information 608 in the first resource block of the subset selected based on the UE PHY ID and encoded sequence 610 in the remaining resource blocks of the selected subset.

Resource set 612a comprises a plurality of resource blocks 614 ordered by frequency. Subsets 616 comprise groupings of nonconsecutive resource block used for enhanced feedback. While the interlacing of subsets 616 depicts an even interlacing of individual resource blocks, any other interlacing methods may be used, including interlaced groups of resource blocks (such as 2 resource blocks of each subset followed by 2 more resource blocks of each subset), or uneven distributions of subsets. In the example of FIG. 6, AKC/NACK information is sent in the first block of the subset and encoded feedback is sent in the remaining resource blocks of the subset. Thus, resource set 612b includes the ACK/NACK information 618 in the first resource block of the subset selected based on the UE PHY ID and encoded sequence 620 in the remaining resource blocks of the selected subset.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 7 is a block diagram of an electronic device in a network environment 700, according to an embodiment. The electronic device of FIG. 7 may comprise the Rx UE or Tx UE performing the functions described herein, such as the UEs of FIG. 1.

Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 740, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 794. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from another component (e.g., the sensor module 746 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

FIG. 8 shows a system including a UE 805 and a gNB 810, in communication with each other. The UE may include a radio 815 and a processing circuit (or a means for processing) 820, which may perform various methods disclosed herein, e.g., the method illustrated in FIG. 1. For example, the processing circuit 720 may receive, via the radio 815, transmissions from the network node (gNB) 810, and the processing circuit 820 may transmit, via the radio 815, signals to the gNB 810.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
   encoding, at a receiving user equipment (Rx UE), feedback information into control information to be transmitted in a plurality of physical sidelink feedback channel (PSFCH) resources according to an encoding scheme, wherein the encoding scheme defines how to encode the feedback information into a combination of the plurality of PSFCH resources, the encoding comprising encoding the feedback information at a corresponding resource block with a corresponding cyclic shift; and
   transmitting the encoded feedback information in the combination of the plurality of PSFCH resources from the Rx UE to a transmitting user equipment (Tx UE), wherein the plurality of PSFCH resources is configured to exclude a resource reserved for acknowledgement/negative acknowledgement (ACK/NACK) feedback, and wherein a resource containing the ACK/NACK feedback is transmitted in the same transmission as the encoded feedback information.

2. The method of claim 1, further comprising:
   detecting a request from the Tx UE to provide enhanced feedback; and
   performing the encoding and transmitting in response to detecting the request from the Tx UE to provide enhanced feedback.

3. The method of claim 2, wherein detecting the request from the Tx UE to provide enhanced feedback comprises identifying a medium access control (MAC) control element in a transport block or a control signaling element in a first stage or second stage sidelink control information (SCI) provided by the Tx UE.

4. The method of claim 2, wherein the request from the Tx UE to provide enhanced feedback specifies a type of feedback from a plurality of types of feedback that the Rx UE is configured to encode.

5. The method of claim 2, wherein the request from the Tx UE to provide enhanced feedback specifies a plurality of resources, and wherein the plurality of PSFCH resources in which the encoded feedback information is transmitted by the Rx UE is selected based on the request specifying the plurality of resources.

6. The method of claim 1, further comprising selecting a strict subset of PSFCH resources in which to provide the encoded feedback information from a plurality of strict subsets of PSFCH resources configured for providing the encoded feedback information.

7. The method of claim 6, wherein selecting the strict subset of PSFCH resources is based on a physical layer identifier (PHY ID) of the Tx UE.

8. The method of claim 6, wherein the strict subset of resource blocks comprises a plurality of non-consecutive resource blocks in a frequency domain.

9. The method of claim 1, wherein the plurality of PSFCH resources is selected from a strict subset of available PSFCH resources based on stored configuration information, wherein the stored configuration information identifies at least one PSFCH resource in the strict subset that is to be used by a plurality of UEs.

10. The method of claim 1, wherein the plurality of PSFCH resources that, in combination, encodes the feedback information is transmitted in resources in multiple transmissions at different points in time.

11. The method of claim 1, further comprising:
detecting a triggering event at the Rx UE; and
in response to detecting the triggering event, performing the encoding of the feedback information.

12. A receiving user equipment (Rx UE) comprising:
one or more processors; and
a memory storing instructions which, when executed by the one or more processors, cause performance of:
encoding feedback information into control information to be transmitted in a plurality of physical sidelink feedback channel (PSFCH) resources according to an encoding scheme, wherein the encoding scheme defines how to encode the feedback information into a combination of PSFCH resources, the encoding comprising encoding the feedback information at a corresponding resource block with a corresponding cyclic shift; and
transmitting the encoded feedback information in the combination of the plurality of PSFCH resources to a transmitting user equipment (Tx UE), wherein the plurality of PSFCH resources is configured to exclude a resource reserved for acknowledgement/negative acknowledgement (ACK/NACK) feedback, and wherein a resource containing the ACK/NACK feedback is transmitted in the same transmission as the encoded feedback information.

13. The Rx UE of claim 12, wherein the instruction, when executed by the one or more processors, further cause performance of:
detecting a request from the Tx UE to provide enhanced feedback; and
performing the encoding and transmitting in response to detecting the request from the Tx UE to provide enhanced feedback.

14. The Rx UE of claim 13, wherein detecting the request from the Tx UE to provide enhanced feedback comprises identifying a medium access control (MAC) control element in a transport block or a control signaling element in a first stage or second stage sidelink control information (SCI) provided by the Tx UE.

15. The Rx UE of claim 13, wherein the request from the Tx UE to provide enhanced feedback specifies: 1) a type of feedback from a plurality of types of feedback that the Rx UE is configured to encode or; or 2) a plurality of resources, wherein the plurality of PSFCH resources in which the encoded feedback information is transmitted by the Rx UE is selected based on the request specifying the plurality of resources.

16. The Rx UE of claim 12, wherein the instruction, when executed by the one or more processors, further cause performance of selecting a strict subset of resource blocks in which to provide the encoded information from a plurality of strict subsets configured for providing encoded feedback information of resource blocks based on a physical layer identifier (PHY ID) of the Tx UE.

17. The Rx UE of claim 12, wherein the instruction, when executed by the one or more processors, further cause performance of selecting, from a plurality of strict subsets of PSFCH resources configured for providing the encoded feedback information, a strict subset of PSFCH resources comprising a plurality of non-consecutive resources in a frequency domain in which to provide the encoded feedback information.

18. The Rx UE of claim 12, wherein the plurality of PSFCH resources that, in combination, encodes the feedback information is transmitted in resource blocks in multiple transmissions at different points in time.

19. The Rx UE of claim 12, wherein the plurality of PSFCH resources is selected from a strict subset of available PSFCH resources based on stored configuration information, wherein the stored configuration information identifies at least one PSFCH resource in the strict subset that is to be used by a plurality of UEs.

* * * * *